(12) United States Patent
Pajukoski et al.

(10) Patent No.: US 7,299,017 B2
(45) Date of Patent: Nov. 20, 2007

(54) COMMUNICATION METHOD, RECEIVER AND BASE STATION

(75) Inventors: Kari Pajukoski, Oulu (FI); Esa Tiirola, Oulu (FI); Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 551 days.

(21) Appl. No.: 10/760,532

(22) Filed: Jan. 21, 2004

(65) Prior Publication Data

US 2005/0101253 A1 May 12, 2005

(30) Foreign Application Priority Data

Nov. 6, 2003 (FI) ................... 20031609

(51) Int. Cl.
*H04B 17/02* (2006.01)
(52) U.S. Cl. ................... 455/137; 455/67.13; 375/343; 375/347
(58) Field of Classification Search ............. 455/67.11, 455/67.13, 63.1, 67.14, 278.1, 137; 375/347, 375/148, 343
See application file for complete search history.

(56) References Cited

U.S. PATENT DOCUMENTS 6,128,355 A * 10/2000 Backman et al. ........... 375/347
2001/0017883 A1 * 8/2001 Tiirola et al. ............... 375/148
2003/0076908 A1 * 4/2003 Huang et al. ............... 375/350
2004/0114695 A1 * 6/2004 Astely et al. ............... 375/343
2005/0101279 A1 * 5/2005 Lee et al. ................. 455/278.1
2005/0111596 A1 * 5/2005 Olsson et al. ............... 375/346

FOREIGN PATENT DOCUMENTS

WO    WO 98/53560     11/1998
WO    WO 02/075950    9/2002

* cited by examiner

*Primary Examiner*—Sanh D. Phu
(74) *Attorney, Agent, or Firm*—Squire, Sanders & Dempsey L.L.P.

(57) ABSTRACT

A multi-user receiver which uses at least two antenna elements and in which the influence of interference is reduced, the receiver comprises: means (200) for pre-filtering a wideband antenna signal, the pre-filtering means being determined on the basis of a spatial covariance matrix estimate, which spatial covariance matrix estimate is obtained from wideband antenna signals by sampling, arranging sampled values into a signal vector and by multiplying the signal vector by its conjugate transpose vector, means (210, 218) for removing the whitening from signals of predetermined users by using an inverse matrix of the matrix used in the whitening filter, means (202, 204, 206, 208, 210) for performing multi-path combining and multi-antenna combining.

7 Claims, 2 Drawing Sheets

COMMUNICATION METHOD, RECEIVER AND BASE STATION

FIELD

Figure 1:
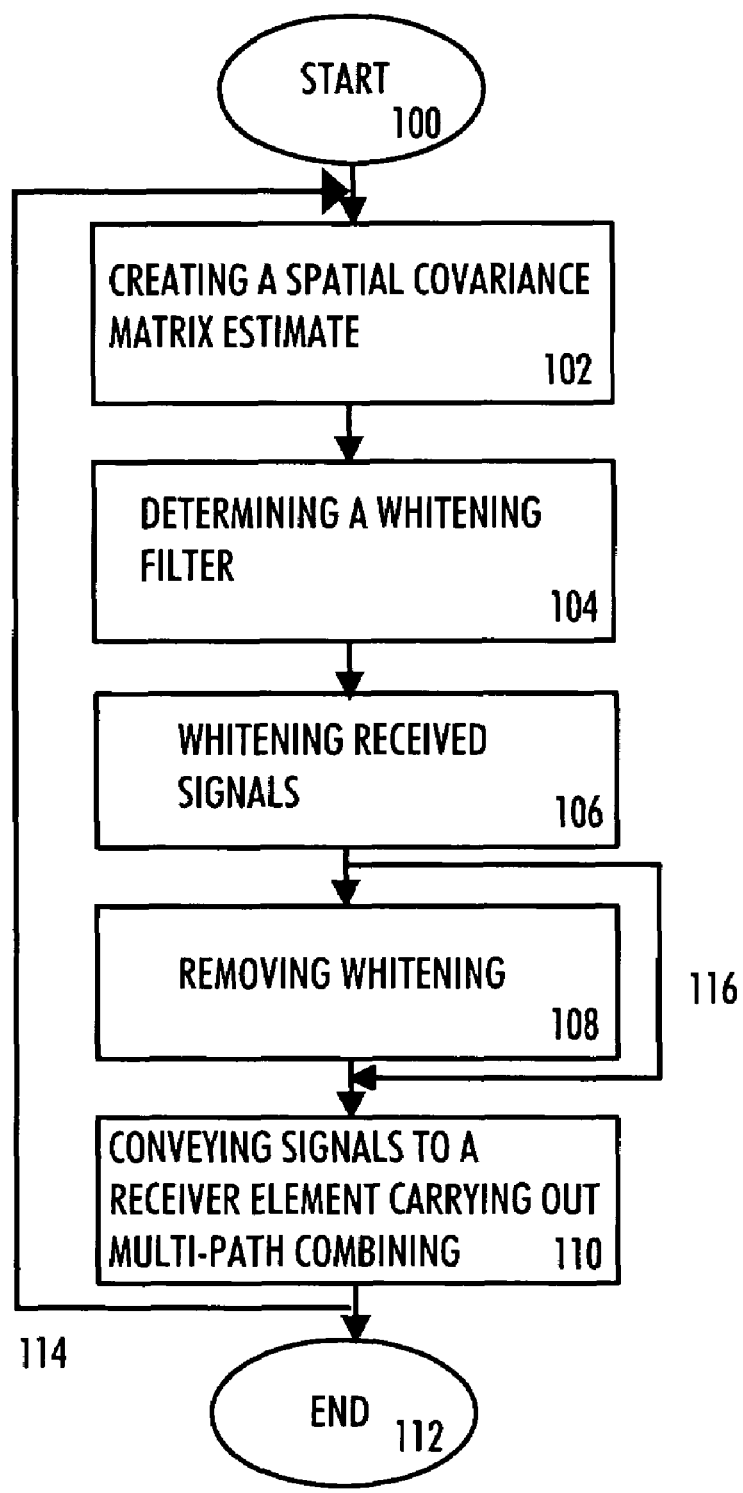

The invention relates to a method for reducing the influence of interference in a multi-user receiver, when the multi-user receiver receives signals from users having different data rates using at least two antenna elements. The invention also relates to a multi-user receiver and a base station.

BACKGROUND

Several combining techniques have usually been used to combine diversity antennas or different antenna branches in antenna arrays to create nulls towards interfering signals while maintaining a large antenna gain towards the desired signal, thus reducing interference. One example of combining techniques is interference rejection combining (IRC). Conventionally the IRC is carried out at symbol level after despreading operations. This requires that the IRC operations need to be implemented separately for each user, thus increasing the complexity of a receiver. For simplifying the receiver structure, the IRC technique is combined with a maximal ratio combining (MRC) technique, whereupon an IRC filter acts as a pre-whitening filter in WO 02/075950. The IRC technique is also examined in Esa Tiirola, Juha Ylitalo: Performance of Smart Antenna Receivers in WCDMA Uplink with Spatially Coloured Interference, IST Mobile Communications Summit 2001, Barcelona, Spain, 9-12 Sep. 2001, which is incorporated herein by reference. While the IRC technique is used in a pre-whitening filter, the pre-whitening is carried out by antenna weighting, which is performed on all users. Thus there arises a problem: the high bit rate users are seen as relatively high level interferers to low bit rate users and therefore taken into account when determining whitening weights. As a consequence of this, in whitening, the combining of antenna signals is not optimal from the high data rate user's point of view. The use of a non-optimal solution will diminish the uplink coverage of high data rate users and at the same time increase the user terminal's battery consumption for the high bit rate users.

BRIEF DESCRIPTIONS OF THE INVENTION

The invention provides an improved method, receiver and base station.

According to an embodiment, there is provided a method for reducing the influence of interference in a multi-user receiver, when the multi-user receiver receives signals from users having different data rates using at least two antenna elements, the method comprises: creating a spatial covariance matrix estimate from wideband antenna signals by sampling, arranging sampled values into a signal vector and by multiplying the signal vector by its conjugate transpose vector, determining a whitening filter on the basis of the spatial covariance matrix estimate, whitening received signals by using the whitening filter, removing the whitening from signals of predetermined users by using an inverse matrix of the matrix used in the whitening filter, conveying whitened signals and the signals from which the whitening has been removed to a receiver element, which carries out multi-path combining and multi-antenna combining.

According to another embodiment, there is provided a multi-user receiver which uses at least two antenna elements and in which the influence of interference is reduced, the receiver comprises: means for pre-filtering a wideband antenna signal, the pre-filtering means being determined on the basis of a spatial covariance matrix estimate, which spatial covariance matrix estimate is obtained from wideband antenna signals by sampling, arranging sampled values into a signal vector and by multiplying the signal vector by its conjugate transpose vector, means for removing the whitening from signals of predetermined users by using an inverse matrix of the matrix used in the whitening filter, means for performing multi-path combining and multi-antenna combining.

According to another embodiment, there is provided a multi-user receiver which uses at least two antenna elements and in which the influence of interference is reduced, the receiver comprises: one branch with a whitening arrangement, another branch without a whitening arrangement and a switching arrangement conveying received signals to the branch with the whitening arrangement or to the branch without the whitening arrangement depending on the used bit rate, a receiver element performing multi-path combining and multi-antenna combining.

According to another embodiment, there is provided a multi-user receiver in which the influence of interference is reduced, comprising: a pre-filter whitening a wideband antenna signal, the pre-filter being determined on the basis of a spatial covariance matrix estimate which spatial covariance matrix estimate is obtained from wideband antenna signals by sampling, arranging sampled values into a signal vector and by multiplying the signal vector by its conjugate transpose vector, a whitening removing arrangement removing the whitening from signals of predetermined users by using an inverse matrix of the matrix used in the whitening filter, a receiver element performing multi-path combining and multi-antenna combining.

According to another embodiment, there is provided a base station comprising a multi-user receiver which receiver uses at least two antenna elements and in which base station the influence of the interference is reduced, the base station comprises: means for pre-filtering a wideband antenna signal, the pre-filtering means being determined on the basis of a spatial covariance matrix estimate, which spatial covariance matrix estimate is obtained from wideband antenna signals by sampling, arranging sampled values into a signal vector and by multiplying the signal vector by its conjugate transpose vector, means for removing the whitening from signals of predetermined users by using an inverse matrix of the matrix used in the whitening filter, means for performing multi-path combining and multi-antenna combining.

According to another embodiment, there is provided a base station comprising a multi-user receiver which uses at least two antenna elements and in which base station the influence of the interference is reduced, the base station comprises: one branch with a whitening arrangement, another branch without a whitening arrangement and a switching arrangement conveying received signals to the branch with the whitening arrangement or to the branch without the whitening arrangement depending on the used bit rate, an element performing multi-path combining and multi-antenna combining.

According to another embodiment, there is provided a base station comprising a multi-user receiver which uses at least two antenna elements and in which base station the influence of the interference is reduced, the receiver comprises: a pre-filter whitening a wideband antenna signal, the pre-filter being determined on the basis of a spatial covariance matrix estimate, which spatial covariance matrix estimate is obtained from wideband antenna signals by sampling, arranging sampled values into a signal vector and by multiplying the signal vector by its conjugate transpose vector, a whitening removing arrangement removing the whitening from signals of predetermined users by using an inverse matrix of the matrix used in the whitening filter, an element performing multi-path combining and multi-antenna combining.

The method and system of the invention provide several advantages. In one embodiment of the invention, the whitening performed by a pre-whitening filter can be removed from predetermined users and therefore the signals can be combined optimally. In another embodiment of the invention, the predetermined users are conveyed to by-pass a pre-whitening filter, thus preventing disadvantages caused by whitening.

LIST OF DRAWINGS

Figure 2:
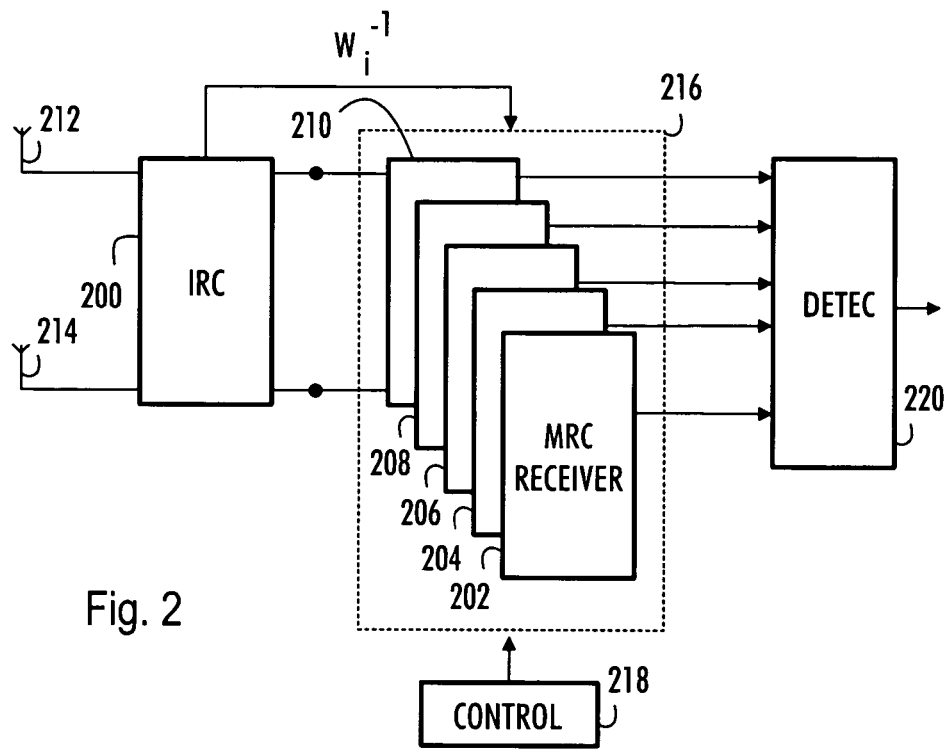
Figure 3:
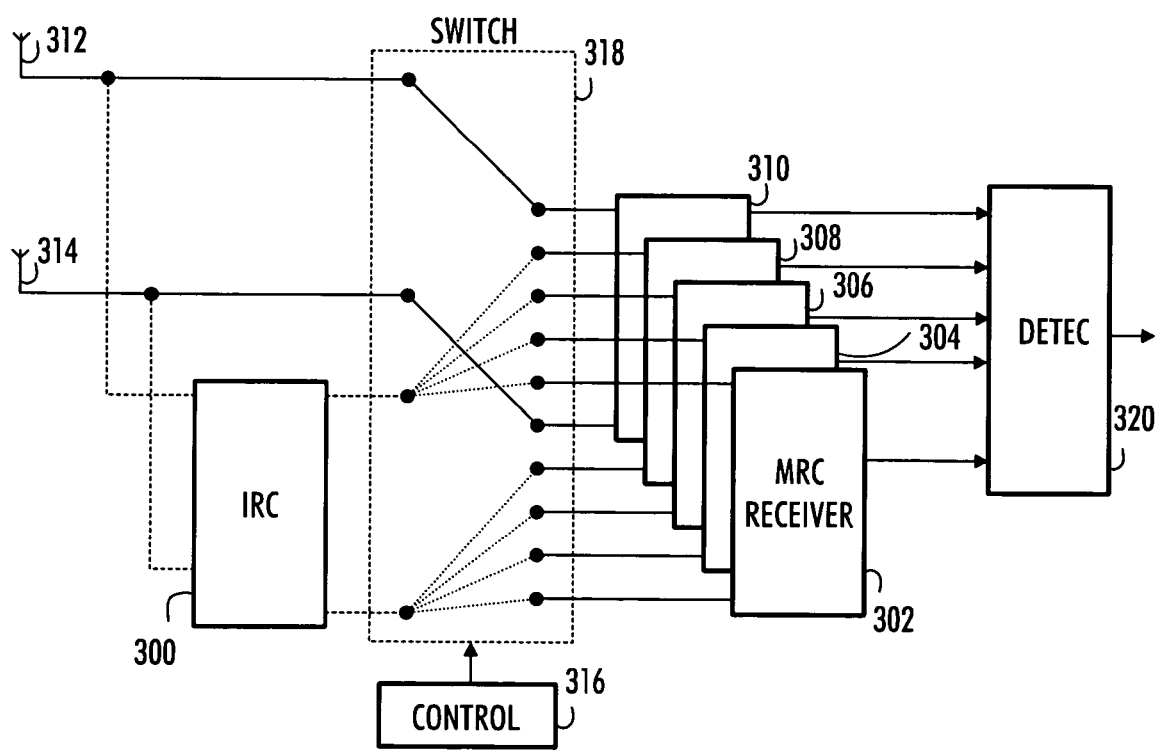

In the following, embodiments of the invention will be described in greater detail with reference to the preferred embodiments and the accompanying drawings, in which FIG. 1 shows an example of a method for reducing the influence of interference in a multi-user receiver, FIG. 2 illustrates an example of a receiver structure for reducing the influence of interference in a multi-user receiver, FIG. 3 shows an example of a receiver structure for reducing the influence of interference in a multi-user receiver.

DESCRIPTION OF EMBODIMENTS

With reference to FIG. 1, let us examine an embodiment of a method for reducing the influence of interference in a multi-user receiver. The method may be used in several kinds of radio receivers, such as a base station of a communication system, for instance a base station used in a wide-band code division multiple access system (WCDMA), such as UMTS (universal mobile telecommunications system). The receiver may, for example, be a Rake receiver or a receiver having diversity antennas. The embodiment is directed to a receiver having a pre-whitening filter in the front-end of an MRC receiver.

The embodiment is especially suitable for systems where there are users having different bit rates, for example, the majority of users use low bit rate services and some users use high bit rate services and the receiver uses several antenna elements. Data rates, which are classified as low or high, vary according to the current system; the data rates tend to increase due to technology development. In this application, the concept of high bit rate users means users having a relatively high bit rate and low bit rate users mean users having a relatively low bit rate. It is possible to set a bit rate threshold and classify users exceeding it as high bit rate users.

The embodiment starts in block 100. In block 102, a covariance matrix estimate is created from wideband antenna signals by sampling, arranging sampled values into a signal vector and by multiplying the signal vector by its conjugate transpose vector. The signals received by different antennas are preferably sampled simultaneously, for which reason sampled values are arranged into a vector format. The size of the vector depends on the number of antennas. Several sampling methods are known in the art and therefore they are not explained here in further detail.

The wideband antenna signal vector representing the desired signal of a single user, related interference and noise can be defined as $$x_i(j) = \sum_l h_l y_i(j - \tau_l) + u_i(j) \tag{1}$$

wherein h is a channel model as a tapped delay line with an impulse response $$\sum_l h_l \delta(j - \tau_l)$$

$u_i$ is a vector including interference and noise components of signal samples,
$y_i$ is a complex-valued transmitted signal,
i is a time slot index,
j is a chip index,
δ means the Dirac's delta function,
τ means a relative delay of a multi-path component,
Σ means summing.

The signal spatial covariance matrix is then calculated by multiplying the signal vector (1) by its conjugate transpose (Hermitian) vector $x_i(j)^H$.

The spatial covariance estimate matrix is typically averaged over a selected period of time, for instance, the averaging length can be chosen to be a time slot or a fraction of it.

The spatial covariance estimate matrix averaged over a time slot having 2560 chips can be expressed as follows $$\hat{R}_{xx,i} = \frac{1}{2560} \sum_{j=1}^{2560} x_i(j) x_i(j)^H \tag{2}$$

wherein $x_i$ is a wideband antenna signal matrix,
i is a time slot index,
j is a chip index.
Σ means summing.

In block 104, a whitening filter is determined on the basis of the covariance matrix estimate. The whitening filter is typically implemented by using a whitening filter matrix. The whitening filter matrix may be obtained in such a way that is satisfies $$W_i W_i^H = \hat{R}_{xx,i}^{-1} \tag{3}$$

wherein $\hat{R}_{xx,i}$ is a covariance matrix estimate,
$W_i$ is a whitening filter matrix,
$W_i^H$ is a complex-conjugate (Hermitian) matrix of the whitening filter matrix,
$^{-1}$ denotes inversion.

The whitening filter matrix can be solved by using Cholesky decomposition, because matrix $\hat{R}_{xx,i}$ is a symmetric and positive definite matrix. The Cholesky decomposition of the spatial covariance matrix estimate $\hat{R}_{xx,i}$ may be written as $$\hat{R}_{xx,i} = U^H U \quad (4)$$

wherein
U is an upper triangular matrix.
If the filter W is chosen as the inverse of the Cholesky factor, i.e., $$UW = I_m \quad (5)$$

wherein
$I_m$ is an identity matrix of size m, then it follows that the equation (3) is satisfied.

In block 106, received signals are whitened by using the whitening filter. The whitening may be carried out by a complex matrix multiplication.

The purpose of whitening is to whiten coloured noise or interference, which means that the powers of interfering signals are transformed by filtering to be similar to that of white Gaussian noise. The whitening adjusts signals for the MRC (maximal ratio combining) because the MRC performance is optimal in case that noise or interference is spatially white Gaussian. The assumption of spatially white Gaussian noise is valid for the interference scenario with a large number of low bit rate users. When there are also high bit rate users, the interference is coloured, in other words the interference is not uncorrelated between different antennas. Whitened received signals (received chips) obtained by matrix multiplication may be written as $$x_{w,i}(j) = W_i x_i(j) \quad (6)$$

wherein
$W_i$ is a whitening filter matrix,
$x_i$ is a wideband antenna signal matrix,
i is a time slot index,
j is a chip index.

In block 108, the whitening is removed from signals of predetermined users by using an inverse matrix of the matrix used in the whitening filter. Removing is typically carried out by matrix multiplication. The removing may be carried out in different places in a reception chain: if the whitening is removed from channel estimates, the channel impulse response matrix is multiplied by the inverse matrix of the whitening matrix, or if the whitening is removed from despread data, the despread data arranged in a matrix format is multiplied by the inverse matrix of the whitening matrix, for example. The whitening is removed from predetermined signals, which in practice can be implemented, for instance, by using a bit rate threshold: the whitening is removed from signals exceeding the threshold.

In practice, the whitening is preferably carried out before a prior art MRC (maximal ratio combining) receiver. The removing of the whitening may also be carried out before the MRC receiver or it may be incorporated in it. The principle of the MRC is that different phase offsets of each received signal are estimated and compensated for after demodulation, the power level of each received signal is estimated and the phase-corrected demodulator outputs are weighted in direct proportion of the received signal strength, the phase-corrected and weighted signals are summed and fed to the detector. The MRC technique is known in the art and is therefore not explained here in greater detail.

In block 110, whitened signals and the signals from which the whitening has been removed are conveyed to a receiver element, which carries out multi-path combining and multi-antenna combining. The element performing multi-path combining and multi-antenna combining may be a maximum ratio combiner. In one embodiment, the multi-path combining and the multi-antenna combining are carried out according to the Rake principle. Arrow 116 depicts that both whitened signals and signals from which the whitening has been removed are conveyed to the multi-path combining and multi-antenna combining.

The embodiment ends in block 112. Arrow 114 depicts one possibility for repeating the embodiment. A generalised example of a part of a receiver depicted by FIG. 2 is now examined. It is obvious to a person skilled in the art that the receiver may also include elements other than those illustrated in FIG. 2. The receiver may be located in several kinds of communication units, such as a base station of a communication system, for instance a base station used in a wideband code division multiple access system (WCDMA), such as UMTS (universal mobile telecommunications system). The receiver may, for example, be a Rake receiver.

The receiver includes an antenna array or diversity antennas 212, 214. The number of antennas may vary according to the implementation. The IRC block 200 is a pre-whitening filter carrying out whitening operation. The pre-whitening filter is determined on the basis of a spatial covariance matrix estimate, which is obtained from the sampled antenna signals. The pre-whitening filter determination is explained above with the aid of the embodiment depicted in FIG. 1.

The MRC receiver structure 216 includes in this embodiment one receiver element 202, 204, 206, 208, 210 per each user. Some of them 202, 204, 206, 208 are for low bit rate users and one 210 for a high bit rate user. The number of MRC receiver elements may vary according to the implementation. In this embodiment, the MRC receiver elements use the Rake principle for multi-path combining and multi-antenna combining.

Low bit rate users are conveyed to their MRC receiver elements for MRC processing. The MRC process includes estimation and compensation for phase offsets of each received signal after demodulation, power level estimation of each received signal, weighting of phase-corrected demodulator outputs in direct proportion of the received signal strength and summation of the phase-corrected and weighted signals. The output of each MRC receiver element is then conveyed to the detector 220. The MRC technique is known in the art and is therefore not explained here in greater detail.

The predetermined user, typically a high bit rate user, is conveyed to its MRC element, where the whitening carried out by a pre-whitening filter 200 is removed by using an inverse matrix $W_i^{-1}$ of the matrix used in the whitening filter. Removing is typically carried out by matrix multiplication. The removing may be carried out in different points of a transmission chain: if the whitening is removed from channel estimates, the estimate channel impulse response matrix is multiplied by the inverse matrix of the whitening matrix, or if the whitening is removed from despread data, the despread data arranged in a matrix format is multiplied by the inverse matrix of the whitening matrix, for example. The whitening is removed from predetermined signals, which in practice can be implemented, for instance, by using a bit rate threshold: the whitening is removed from signals exceeding the threshold. The removing may also be carried out in a separate removing block in the front end of a MRC receiver or receiver element.

The control block 218 controls the function of the MRC receiver and also the removing of whitening. The whitening and the removing of whitening are typically implemented according to the present embodiment as a processor and software, but different hardware implementations are also feasible, e.g. a circuit built of separate logic components or one or more client-specific integrated circuits (Application-Specific Integrated Circuit, ASIC). A hybrid of these implementations is also feasible.

Next another generalised example of a part of a receiver is examined with the aid of FIG. 3. The receiver of this embodiment includes one branch with a whitening procedure and another branch without a whitening procedure. Received signals are conveyed to the branch with the whitening procedure or to the branch without the whitening procedure depending on the used bit rate.

It is obvious to a person skilled in the art that the receiver may also include elements other than illustrated in FIG. 3. The receiver may be located in several kinds of communication units, such as a base station of a communication system, for instance a base station used in a wideband code division multiple access system (WCDMA), such as UMTS (universal mobile telecommunications system). The receiver may, for example, be a Rake receiver.

The receiver includes an antenna array or diversity antennas 312, 314. The number of antennas may vary according to the implementation. The IRC block 300 is a pre-whitening filter carrying out whitening operation. The pre-whitening filter is determined on the basis of a spatial covariance matrix estimate, which is obtained from the sampled antenna signals. The pre-whitening filter determination is explained above with the aid of the embodiment depicted in FIG. 1.

The receiver also includes logical MRC receivers 302, 304, 306, 308 for low bit rate users and one 310 for a high bit rate user. There are available two connections per antenna: one 322A, 324A for wideband antenna signal passing the pre-whitening filter (IRC block) 300 and another one 322B, 324B which conveys signals to the pre-whitening filter. There is also a switching block 318 which switches low bit rate users to their MRC receivers 302, 304, 306, 308 and a high bit rate user to its MRC receiver 310. In this embodiment, the MRC receiver elements use the Rake principle for multi-path combining and multi-antenna combining. The MRC process includes estimation and compensation for phase offsets of each received signal after demodulation, power level estimation of each received signal, weighting of phase-corrected demodulator outputs in direct proportion of the received signal strength and summation of the phase-corrected and weighted signals. The output of each MRC receiver element is then conveyed to the detector 320. The MRC technique is known in the art and is therefore not explained here in greater detail.

The control block 316 controls the function of the switching block 318 according to the user's bit rate conveying the high bit rate users to by-pass the pre-whitening filter 300. The switching is typically implemented as a hardware implementation.

Even though the invention is described above with reference to an example according to the accompanying drawings, it is clear that the invention is not restricted thereto but it can be modified in several ways within the scope of the appended claims.

The invention claimed is:

1. A multi-user receiver comprising:
   a branch with a whitening arrangement;
   another branch without a whitening arrangement;
   a switching means for conveying received signals to the branch with the whitening arrangement or to the another branch without the whitening arrangement depending on a used bit rate, wherein the multi-user receiver is configured to use at least two antenna elements and in which an influence of interference is reduced;
   receiving means for performing multi-path combining and multi-antenna combining; and
   determining means for determining the predetermined users from whom the whitening is removed based on a bit rate threshold.

2. The multi-user receiver of claim 1, wherein the whitening is carried out in the whitening arrangement by complex matrix multiplication.

3. The multi-user receiver of claim 1, wherein the receiving means for performing the multi-path combining and the multi-antenna combining comprises a maximum ratio combiner.

4. A base station comprising:
   a multi-user receiver, wherein the multi-user receiver is configured to use at least two antenna elements and, in the base station, an influence of an interference is reduced;
   a branch with a whitening arrangement, another branch without a whitening arrangement and a switching arrangement configured to convey received signals to the branch with the whitening arrangement or to the another branch without the whitening arrangement depending on a used bit rate;
   an element configured to perform multi-path combining and multi-antenna combining; and
   a determining unit configured to determine the predetermined users from whom the whitening is removed based on a bit rate threshold.

5. A multi-user receiver comprising:
   a branch with a whitening arrangement;
   another branch without a whitening arrangement;
   a switching arrangement configured to convey received signals to the branch with the whitening arrangement or to the another branch without the whitening arrangement depending on a used bit rate, wherein the multi-user receiver uses at least two antenna elements and in which an influence of interference is reduced;
   a receiver element configured to perform multi-path combining and multi-antenna combining; and
   a determining unit configured to determine the predetermined users from whom the whitening is removed based on a bit rate threshold.

6. The multi-user receiver of claim 5, wherein the whitening is carried out in the whitening arrangement by complex matrix multiplication.

7. The multi-user receiver of claim 5, wherein the receiver element comprises a maximum ratio combiner.

* * * * *